United States Patent
Wu et al.

(10) Patent No.: US 11,753,339 B2
(45) Date of Patent: Sep. 12, 2023

(54) HIGH-STRENGTH CONCRETE AND PREPARATION METHOD THEREOF

(71) Applicants: Shandong University, Jinan (CN); China Power Construction Municipal Construction Group Co., Ltd, Tianjin (CN); Northeast Electric Power University, Jilin (CN); Shandong Boshuo Geotechnical Engineering Design Consulting Co., Ltd, Jinan (CN)

(72) Inventors: Ke Wu, Jinan (CN); Tao Yang, Jinan (CN); Cao Wang, Jinan (CN); Guodong Li, Jinan (CN); Rong Chen, Jinan (CN); Jiahui Zhao, Jinan (CN); Dongxue Hao, Jinan (CN); Mingyue Ma, Jinan (CN); Hongna Yang, Jinan (CN)

(73) Assignees: Shandong University, Jinan (CN); China Power Construction Municipal Construction Group Co., Ltd, Tianjin (CN); Northeast Electric Power University, Jilin (CN); Shandong Boshuo Geotechnical Engineering Design Consulting Co., Ltd, Jinan (CN)

( * ) Notice: Subject to any disclaimer, the term of this patent is extended or adjusted under 35 U.S.C. 154(b) by 0 days.

(21) Appl. No.: 18/152,145

(22) Filed: Jan. 9, 2023

(65) Prior Publication Data

US 2023/0159391 A1 May 25, 2023

Related U.S. Application Data

(63) Continuation of application No. PCT/CN2021/095049, filed on May 21, 2021.

(30) Foreign Application Priority Data

Aug. 4, 2020 (CN) .......................... 202010770750.2

(51) Int. Cl.
   C04B 18/16   (2023.01)
   C04B 28/04   (2006.01)
   C04B 26/00   (2006.01)

(52) U.S. Cl.
   CPC ............ *C04B 18/16* (2013.01); *C04B 26/006* (2013.01); *C04B 28/04* (2013.01)

(58) Field of Classification Search
   CPC ....... C04B 18/16; C04B 18/00; C04B 26/006; C04B 28/04
   See application file for complete search history.

(56) References Cited

U.S. PATENT DOCUMENTS

2017/0283293 A1   10/2017   Shin et al.

FOREIGN PATENT DOCUMENTS

| CN | 103771776 A | 5/2014 |
|----|---|---|
| CN | 104788054 A | 7/2015 |
| CN | 106007556 A | 10/2016 |
| CN | 106277953 A | 1/2017 |
| CN | 107445529 A | 12/2017 |
| CN | 107892497 A | 4/2018 |
| CN | 108752600 A | 11/2018 |
| CN | 109369087 A | 2/2019 |
| CN | 110041028 A | 7/2019 |
| CN | 110482959 A | 11/2019 |
| CN | 110590294 A | 12/2019 |
| CN | 111848051 A | 10/2020 |
| CN | 112062518 A | 12/2020 |
| CN | 113149536 A | 7/2021 |
| KR | 1020160108772 A | 9/2016 |

OTHER PUBLICATIONS

Text of CN110423058 A Nov. 2019 (Year: 2019).*
Internation Search Report of PCT/CN2021/095049, dated Aug. 20, 2021.
Chen Xi et al., "Experimental study on the cementing performance of recycled micronized powder from waste concrete", China Concrete and Cement Products, No. 11, 2019, pp. 96-100.

* cited by examiner

*Primary Examiner* — Shuangyi Abu Ali

(57) ABSTRACT

The present disclosure relates to a high-strength concrete and a preparation method thereof. The high-strength concrete includes lignin, recycled fine powder, cement, water, sand, gravels and a water reducing agent. The recycled fine powder is recycled fine powder of discarded concrete, and is prepared by separating solid waste of discarded buildings, then performing impurity removal and crushing processing, and grinding same by a ball mill into dust with a particle size of less than 0.16 mm. The lignin is discarded wood lignin, which is prepared by crushing the wood, stirring and extracting a sodium hydroxide aqueous solution with a mass concentration of 5% for 1 to 2 hours at the temperature of 80 DEG C. to obtain a black lignin alkali solution, adding a hydrochloric acid solution with a mass concentration of 30% into the alkali solution for stirring, and making the pH reduced to 7.0 for standing and layering.

2 Claims, No Drawings

HIGH-STRENGTH CONCRETE AND PREPARATION METHOD THEREOF

CROSS-REFERENCE TO RELATED APPLICATIONS

This application is a continuation of International Patent Application No. PCT/CN2021/095049 with a filing date of May 21, 2021, designating the United States, now pending, and further claims priority to Chinese Patent Application No. 202010770750.2 with a filing date of Aug. 4, 2020. The content of the aforementioned applications, including any intervening amendments thereto, are incorporated herein by reference.

TECHNICAL FIELD

The present disclosure relates to a high-strength concrete and a preparation method thereof, in particular to a high-strength concrete added with discarded wood lignin and recycled fine powder of discarded concrete, and belongs to the technical field of concrete preparation.

BACKGROUND

With the continuous acceleration of urbanization in my country, the civil construction industry has developed rapidly in China, but many outstanding problems have also arisen. In the process of urban construction, the demolition of old houses and the construction of new houses will both produce a huge amount of construction waste. According to relevant studies, the output of construction waste accounts for 30% of the total urban waste in my country, with an annual output of nearly 700 million tons. With the huge amount of discarded concrete and discarded wood produced in the process of urban development and construction, how to effectively deal with and form recyclable engineering materials to reduce the consumption of my country's limited resources and the recycling of resources and the environment has become a hot topic of concern today. Based on this, the present disclosure achieves the goals of enhancing concrete strength and recycling construction waste by adding discarded wood lignin and recycled fine powder of discarded concrete during the preparation of ordinary concrete.

SUMMARY

In view of the problems mentioned above, the present disclosure provides a high-strength concrete and a preparation method thereof, and specifically relates to a high-strength concrete added with discarded wood lignin and recycled fine powder of discarded concrete. The present disclosure is suitable for common construction projects and can effectively improve the strength of concrete. The technical solution of the present disclosure is as follows:

A high-strength concrete, including lignin, recycled fine powder, cement, water, sand, gravels and a water reducing agent;

the recycled fine powder is recycled fine powder of discarded concrete, and is specifically prepared by: separating solid waste of discarded buildings, then performing impurity removal and crushing processing, and grinding same by a ball mill into dust with a particle size of less than 0.16 mm.

The recycled fine powder of discarded concrete is dust with a particle size of less than 0.16 mm, accounting for about 5% to 10% of the total discarded concrete, which is generated in the process of crushing and screening waste concrete on the basis of the crushing process and concrete strength. Small dust particles floating in the atmosphere will cause serious air pollution, and also endanger people's health at the same time. On this basis, the recycled fine powder can be obtained by separating solid waste of discarded buildings, then performing impurity removal and crushing processing, and grinding same by a ball mill into dust. The recycled fine powder contains a large amount of $SiO_2$, which can generate gel in the concrete to fill pores in the concrete, and the recycled fine powder contains a certain amount of hardened cement stone and incompletely hydrated cement, which have high activity and can increase the concrete strength of the recycled fine powder after reacting with water due to a large specific surface area.

The lignin is discarded wood lignin, having an extraction method as follows:

crushing the wood, stirring and extracting a sodium hydroxide aqueous solution with a mass concentration of 5% for 1 to 2 hours at the temperature of 80 DEG C. to obtain a black lignin alkali solution, adding a hydrochloric acid solution with a mass concentration of 30% into the alkali solution for stirring, and making the pH reduced to 7.0 for standing and layering to obtain the lignin.

The lignin obtained by the present disclosure is a highly cross-linked organic polymer, which can firmly glue the surrounding concrete together with its own structure, so that the concrete structure is more stable.

By adding the lignin and recycled fine powder prepared from the construction waste, the present disclosure not only significantly improves the strength level of the concrete, but also realizes the recycling and recycling of the construction waste.

Preferably, the weight ratio of the cement, water, sand, gravels and water reducing agent in the high-strength concrete is 1:0.3:1.2:2.8:0.01.

More preferably, the weight ratio of the lignin to the recycled fine powder is 0.1:5-10.

More preferably, the weight ratio of the lignin to the cement is 0.1-0.3:20.

More preferably, P•042.5 grade cement is adopted, gravels with a particle size of 6 mm to 10 mm are adopted, and a polycarboxylic acid water reducing agent is adopted.

Further, a preparation method of the high-strength concrete mentioned above includes the following steps:

step (1) preparation of recycled fine powder: separating solid waste of discarded buildings, then performing impurity removal and crushing processing, and grinding same by a ball mill into dust with a particle size of less than 0.16 mm;

step (2) preparation of lignin: crushing the wood, stirring and extracting a sodium hydroxide aqueous solution with a mass concentration of 5% for 1 to 2 hours at the temperature of 80 DEG C. to obtain a black lignin alkali solution, adding a hydrochloric acid solution with a mass concentration of 30% into the alkali solution for stirring, and making the pH reduced to 7.0 for standing and layering to obtain the lignin;

step (3) pouring the lignin and the recycled fine powder into part of the water for uniform mixing;

step (4) pouring the cement into the remaining water for uniform stirring with a cement mixer;

step (5) pouring the mixed solution of the lignin and the recycled fine powder into the cement uniformly stirred in step (4), and then adding the water reducing agent for uniform mixing to obtain a mixed solution A; and step (6) pouring the gravels and sand into the mixed solution A in step (5) for full stirring to obtain the high-strength concrete.

Preferably, P•042.5 grade cement is adopted, gravels with a particle size of 6 mm to 10 mm are adopted, and a polycarboxylic acid water reducing agent is adopted; and the ratio of water in the step (3) and step (4) is 1:2. Compared with the prior art, the present disclosure has the following advantages.

1. A huge amount of construction waste is produced every year in China. The disposal of discarded waste is expensive and occupies a large area of land, which seriously restricts economic development. Recycling discarded construction waste not only greatly reduces the cost of processing construction waste, but also reduces the harm brought by the discarded construction waste, which is in line with the concept of sustainable development in China.

2. Discarded wood lignin is a high-molecular polymer, which can bond concrete together with its own structure properties, so that the concrete structure is denser.

3. The recycled fine powder of discarded concrete can not only fill concrete pores, but also hydrate with water to form a high-strength hydration product, which forms certain protection for the concrete structure, thereby improving the concrete strength.

4. According to the present disclosure, by limiting the content of each component and selecting the optimal mixing ratio according to the actual working conditions, the concrete strength is significantly improved.

DETAILED DESCRIPTION

The present disclosure will be further described below with reference to specific embodiments, and the advantages and characteristics of the present disclosure will become clear from the description. However, the embodiments are only exemplary and do not constitute any limitation to the scope of the present disclosure. It should be understood by those skilled in the art that modifications and replacements may be made to the details and forms of the technical solutions of the present disclosure without departing from the spirit and scope of the present disclosure, and all these modifications and replacements shall fall within the protection scope of the present disclosure.

Embodiment One: A High-Strength Concrete and a Preparation Method Thereof.

At step 1, P•042.5 grade cement is adopted, gravels with a particle size of 6 m to 10 m are adopted, and a polycarboxylic acid water reducing agent is adopted;

preparation of recycled fine powder: separating solid waste of discarded buildings, then performing impurity removal and crushing processing, and grinding same by a ball mill into dust with a particle size of less than 0.16 m; and preparation of lignin: crushing the wood, stirring and extracting a sodium hydroxide aqueous solution with a mass concentration of 5% for 1 to 2 hours at the temperature of 80 DEG C. to obtain a black lignin alkali solution, adding a hydrochloric acid solution with a mass concentration of 30% into the alkali solution for stirring, and making the pH reduced to 7.0 for standing and layering to obtain the lignin.

At step 2, 20 kg of cement, 6 kg of water, 24 kg of sand, 56 kg of gravels, and 0.2 kg of water reducing agent are weighted using a meter.

At step 3, 0.1 kg of lignin and 10 kg of recycled fine powder are poured into 2 kg of water for uniform mixing.

At step 4, 20 kg of cement is poured into 4 kg of water for full stirring with a cement mixer.

At step 5, the mixed solution of lignin and recycled fine powder is poured into the cement stirred uniformly in step 4, then 0.2 kg of water reducing agent is added for uniform mixing to obtain a mixed solution A.

At step 6, 56 kg of gravels and 24 kg of sand are poured into the mixed solution A in step 5 for full stirring to obtain the high-strength concrete.

Embodiment Two: A High-Strength Concrete and a Preparation Method Thereof

At step 1, P•042.5 grade cement is adopted, gravels with a particle size of 6 mm to 10 mm are adopted, and a polycarboxylic acid water reducing agent is adopted;

preparation of recycled fine powder: separating solid waste of discarded buildings, then performing impurity removal and crushing processing, and grinding same by a ball mill into dust with a particle size of less than 0.16 mm; and preparation of lignin: crushing the wood, stirring and extracting a sodium hydroxide aqueous solution with a mass concentration of 5% for 1 to 2 hours at the temperature of 80 DEG C. to obtain a black lignin alkali solution, adding a hydrochloric acid solution with a mass concentration of 30% into the alkali solution for stirring, and making the pH reduced to 7.0 for standing and layering to obtain the lignin.

At step 2, 20 kg of cement, 6 kg of water, 24 kg of sand, 56 kg of gravels, and 0.2 kg of water reducing agent are weighted using.

At step 3, 0.2 kg of lignin and 12 kg of recycled fine powder are poured into 1.5 kg of water for uniform mixing.

At step 4, 20 kg of cement is poured into 4.5 kg of water for full stirring with a cement mixer.

At step 5, the mixed solution of lignin and recycled fine powder is poured into the cement stirred uniformly in step 4, and then 0.2 kg of water reducing agent is added for uniform mixing to obtain a mixed solution A.

At step 6, 56 kg of gravels and 24 kg of sand are poured into the mixed solution A in step 5 for full stirring to obtain the high-strength concrete.

Embodiment Three: A High-Strength Concrete and a Preparation Method Thereof

At step 1, P•042.5 grade cement is adopted, gravels with a particle size of 6 mm to 10 mm are adopted, and a polycarboxylic acid water reducing agent is adopted;

preparation of recycled fine powder: separating solid waste of discarded buildings, then performing impurity removal and crushing processing, and grinding same by a ball mill into dust with a particle size of less than 0.16 mm; and preparation of lignin: crushing the wood, stirring and extracting a sodium hydroxide aqueous solution with a mass concentration of 5% for 1 to 2 hours at the temperature of 80 DEG C. to obtain a black lignin alkali solution, adding a hydrochloric acid solution with amass concentration of 30% into the alkali solution for stirring, and making the pH reduced to 7.0 for standing and layering to obtain the lignin.

At step 2, 20 kg of cement, 6 kg of water, 24 kg of sand, 56 kg of gravels, and 0.2 kg of water reducing agent are weighted using a meter.

At step 3, 0.3 kg of lignin and 15 kg of recycled fine powder are poured into 2 kg of water for uniform mixing.

At step 4, 20 kg of cement is poured into 4 kg of water for full stirring with a cement mixer.

At step 5, the mixed solution of lignin and recycled fine powder is poured into the cement stirred uniformly in step 4), and then 0.2 kg of water reducing agent is added for uniform mixing to obtain a mixed solution A.

At step 6, 56 kg of gravels and 24 kg of sand are poured into the mixed solution A in step 5 for full stirring to obtain the high-strength concrete.

Experimental Example One: Axial Compression Experiment

Experimental Steps:

In the axial compressive strength experiment, a 150 mm*150 mm*300 mm prismatic specimen is used and standardly cured to a specified age. The specimen is placed upright, with the axis of the specimen aligned with the center of a lower platen of a testing machine, and load is applied at a specified speed until a failure, so as to measure its axial compressive strength. The experimental results are shown in Table 1:

TABLE 1

| Specimen Group Number | Compressive Strength (MPa) |
|---|---|
| Plain concrete | 33.10 |
| High-strength concrete obtained in Embodiment one | 37.62 |
| High-strength concrete obtained in Embodiment two | 37.79 |
| High-strength concrete obtained in Embodiment three | 38.29 |

Experimental Results:

By means of the axial compressive strength experiment of plain concrete and the concrete obtained by the present disclosure respectively, the experimental results show that the high-strength concrete obtained by the present disclosure has a significant increase in the compressive strength.

What is claimed is:

1. A concrete comprising lignin, recycled fine powder, P.042.5 grade cement, water, sand, gravels with a particle size of 6 mm to 10 mm, and a polycarboxylic acid water reducing agent; wherein
  a weight ratio of the cement, water, sand, gravels and the polycarboxylic acid water reducing agent in the concrete is 1:0.3:1.2:2.8:0.01;
  a weight ratio of the lignin to the cement in the concrete is 0.1-0.3:20;
  a weight ratio of the lignin to the recycled fine powder in the concrete is 0.1:5-10;
  the recycled fine powder is recycled powder of discarded concrete, and is prepared by: separating solid waste of discarded buildings, removing impurity and crushing, and grinding into dust with a particle size of less than 0.16 mm by a ball mill;
  the lignin is discarded wood lignin, which is extracted by: crushing wood, stirring and extracting with a sodium hydroxide aqueous solution with a mass concentration of 5% for 1 to 2 hours at 80° C. to obtain a black lignin alkali solution, adding a hydrochloric acid solution with a mass concentration of 30% into the black lignin alkali solution while stirring, reducing pH to 7.0, and obtaining the lignin by standing and layer separation;
  and the concrete is made by a method comprising the following steps:
  (1) pouring the lignin and the recycled fine powder into a portion of water to obtain a first uniformly mixed mixture,
  (2) pouring the cement into the remaining water with a cement mixer to obtain a second uniformly mixed mixture,
  (3) pouring the first uniformly mixed mixture into the second uniformly mixed mixture to obtain a third mixture, and then adding the polycarboxylic water reducing agent to the third mixture to obtain a uniformed mixed mixture A, and
  (4) pouring the gravels and sand into the uniformly mixed mixture A for thoroughly stirring to obtain the concrete.

2. The concrete of claim 1, wherein a ratio of water in the step (1) and step (2) is 1:2.

* * * * *